Dec. 29, 1925.
S. WIELGUS
1,567,311
REVERSIBLE PLOW
Filed Oct. 7, 1922
2 Sheets-Sheet 1
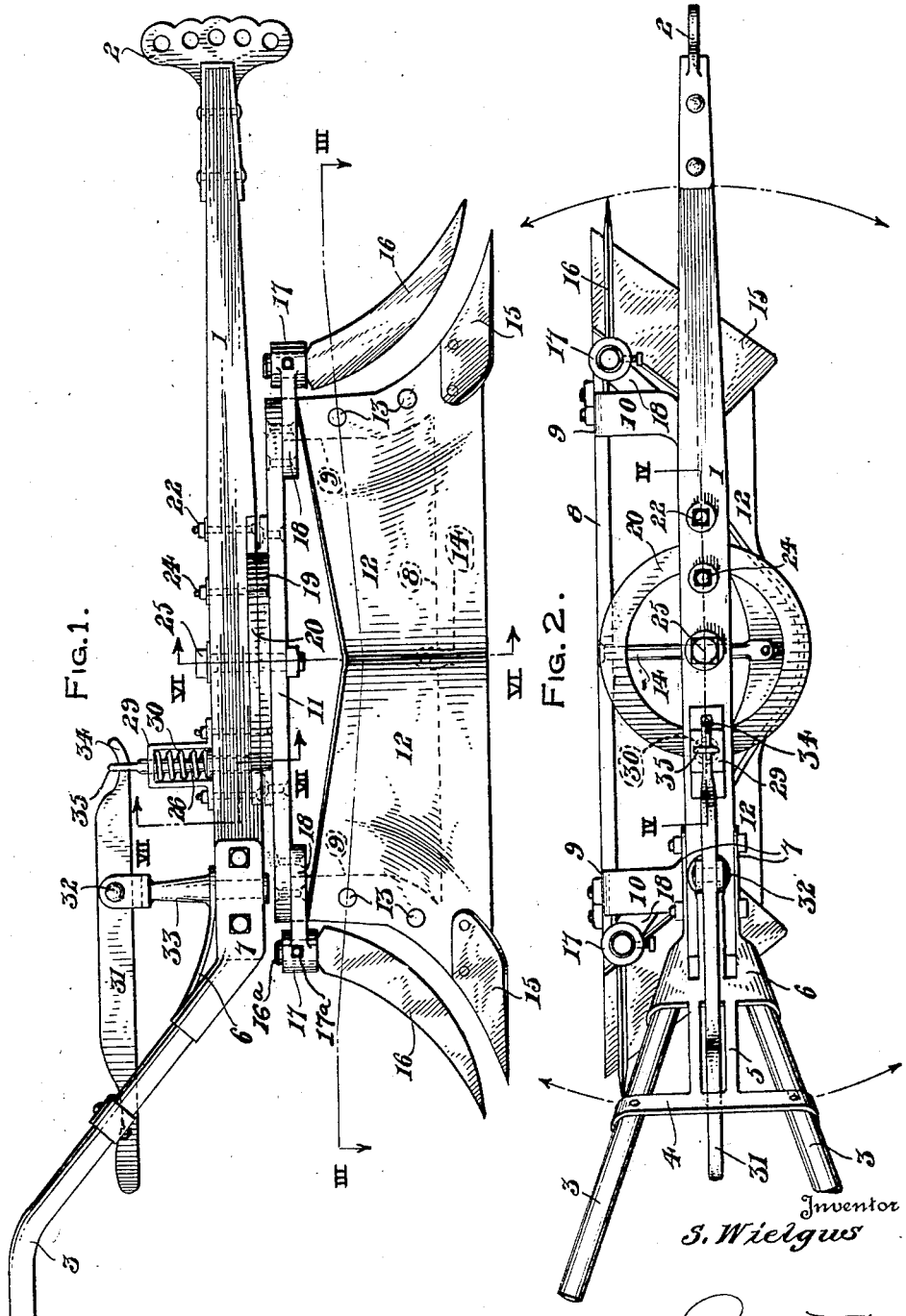
Inventor
S. Wielgus
By F. L. Bryant,
Attorney Dec. 29, 1925.
S. WIELGUS
1,567,311
REVERSIBLE PLOW
Filed Oct. 7, 1922
2 Sheets-Sheet 2
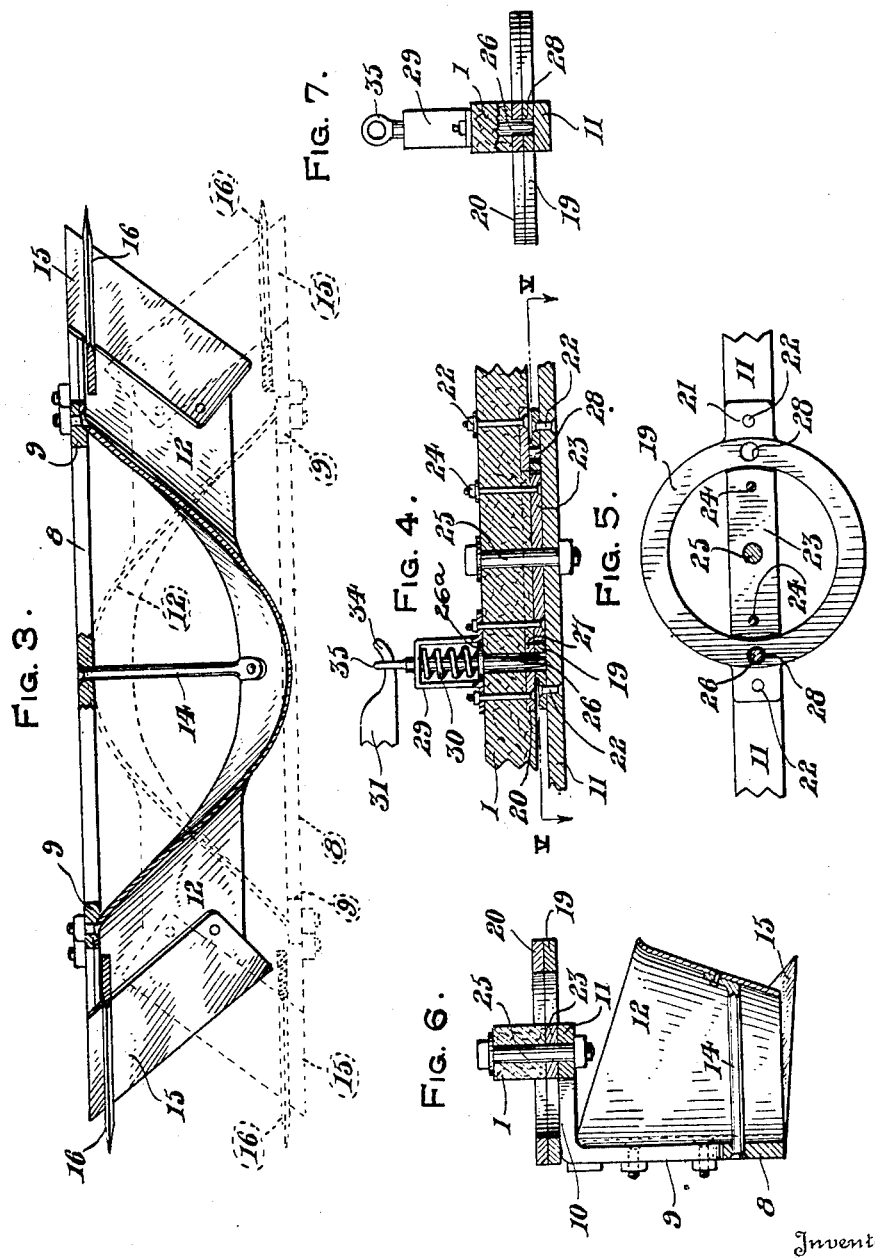
Inventor
S. Wielgus
By F. D. Bryant
Attorney Patented Dec. 29, 1925.

1,567,311

UNITED STATES PATENT OFFICE.

STANISLAW WIELGUS, OF SUN, WEST VIRGINIA.

REVERSIBLE PLOW.

Application filed October 7, 1922. Serial No. 592,996.

*To all whom it may concern:*

Be it known that I, STANISLAW WIELGUS, a citizen of Poland, residing at Sun, in the county of Fayette and State of West Virginia, have invented certain new and useful Improvements in Reversible Plows, of which the following is a specification.

This invention relates to certain new and useful improvements in reversible plows wherein a frame structure supporting a plow point at each end thereof is rotatably adjustable on a plow beam for reversing or placing either plow points at the forward end of the beam to direct the earth clods to either side of the beam.

The primary object of the invention resides in the provision of a reversible plow wherein a frame structure constituting a mold board is rotatably supported beneath a plow beam with a plow point carried by each end thereof upon the same side of the mold board, so that upon reversing the position of a mold board, the plow point will be disposed for directing the earth clods to either side of the beam of the plow.

With the above and other objects in view as the nature of the invention is better understood, the same consists of the novel form, combination and arrangement of parts hereinafter more fully described, shown in the accompanying drawings and claimed.

In the drawings, wherein like reference characters designate corresponding parts throughout the several views, Figure 1 is a side elevational view of a reversible plow constructed in accordance with the present invention showing a mold board carrying a plow point at each end thereof rotatably adjustable beneath the plow beam, Figure 2 is a top plan view of the plow, Figure 3 is a longitudinal sectional view taken on line III—III of Fig. 1 showing the longitudinally curved mold board, the connecting bar between the ends thereof and the plow points carried by the ends, the same being illustrated by dotted lines in its reversed position, Figure 4 is a detail sectional view taken on line IV—IV of Fig. 2 showing the tensioned latch bolt for retaining the plow in its adjusted position, Figure 5 is a detail sectional view taken on line V—V of Fig. 4 showing the ring member carried by the upper bar of the plow structure, Figure 6 is a vertical cross sectional view taken on line VI—VI of Fig. 1, and Figure 7 is a detail sectional view taken on line VII—VII of Fig. 1.

Referring more in detail to the accompanying drawings, there is illustrated a reversible plow embodying a longitudinal beam 1 provided with a clevis 2 at the forward end thereof for attachment to draft means, the rear end of the means carrying diverging handle bars 3 with which a cross brace 4 is associated as illustrated in Figs. 1 and 2. The cross brace 4 includes the slotted arm 5 extending toward the plow beam 1 and formed integral with a brace plate 6 having the opposite edges thereof engaging the handle bars 3 and anchored as at 7 to the rear end of the plow beam.

The reversible plow per se includes a longitudinally extending base bar 8 carrying upstanding arms 9 at the opposite ends thereof that are angularly bent at their upper ends in the same direction to form horizontal extensions 10 with an integral rod 11 connecting the ends thereof, this construction being clearly shown in Figs. 1, 2 and 6. A longitudinally curved double mold board 12 is secured as at 13 to the opposite ends of the base rod 8 and the perpendicular end arms beneath the horizontal arm extensions 10 and the upper horizontal rail 11, while an intermediate brace rod 14 extends between the base rod 8 and the adjacent portion of the mold board 12 as clearly shown in Figs. 2, 3 and 6. Each lower corner portion of the mold board 12 carries a plow point 15 while a colter blade 16 is anchored in the bearing 17 carried by the bracket arm 18 secured to the opposite ends of the upper rail 11. These colters are each provided with an upper end forming a joint 16ª which is received in the respective bearing cuffs 17 and is held in adjusted position by a set screw 17ª.

The connecting means between the plow structure and the plow beam includes a ring 19 associated with the upper rail 11, and a ring 20 associated with the plow beam 1, the two rings being concentrically positioned, and each carrying diametrically opposite ears 21 that are anchored to the rail 11 and beam 1, respectively, by fastening devices 22. A spacing bar 23 is anchored to the beam 1 by the fastening devices 24 for properly spacing the rail 11 and beam 1, as well as the two cooperating rings 19 and 20, as will be understood from an inspection of Fig. 4 of the drawing. A centrally disposed pivot bolt 25 connects the upper rail 11 of the plow structure to the plow beam 1 and extends through the spacing plate 23 as illustrated.

The plow structure being pivotally supported beneath the beam 1, the same is retained in adjusted or reverse positions by the pin 26 passing through an opening 27 at one side of the ring 20 for selective reception in the diametrically opposite openings 28 provided in the lower ring 19 carried by the upper rail 11 of the plow structure. The upper end of the locking pin 26 extends through an inverted U-shaped yoke forming a housing 29 that encloses a coil spring 30 surrounding the upper end of the pin for normally forcing the same in a downward direction for reception in the openings 28 of the ring 19, this construction being clearly shown in Figs. 1 and 4. The lower end of the spring 30 bears against the colter 26ª formed on the pin 26 and normally resting on top of the plow beam. Thus the colter 26ª forms a limit stop for the downward movement of the pin as well as a bearing for the lower end of the spring. To elevate the locking pin 26 against the tension of the spring 30, a manually operable lever 31 pivotally mounted as at 32 upon a standard 33 carried by the rear end of the plow beam 1, has the forward end 34 thereof reduced as illustrated and associated with an eye 35 carried by the upper end of the locking pin 26, the spring 30 causing a lowering movement of the end 34 of the lever 31 for moving the gripping or operating end of said lever into engagement with the lower edge of the cross brace 4 as shown in Figs. 1 and 2, the lever 31 extending through the slot formed in the arm 5 as shown.

From the above detail description of the device, it is believed that the construction and operation thereof will at once be apparent, it being noted that when the lever arm 31 is depressed at its outer end, the forward end 34 thereof will elevate the spring pressed locking pin 26 to displace the same from either of the openings 28 in the ring 19 to permit the lower plow structure including the upper rail 11 to pivotally move upon the bolt 25, reversing the plow from the position shown by full lines in Fig. 3, to that shown by dotted lines, thus reversing the throwing of the earth clods from one side of the plow beam to the other side thereof. The plow structure is rigidly secured in its adjusted position by the locking pin 26 entering either of the openings 28 in the ring 19.

What is claimed as new is:—

In a plow of the class described, a longitudinally extending upper rail bar having laterally extending ends terminating in downwardly bent portions forming standards, the lower ends of said standards being connected by a longitudinally extending base rod forming a landside bar, a pair of oppositely directed plows each carried by a respective standard, a brace rod extending between the base rod and plows, a plow beam extending longitudinally over the top rail, a turntable ring fixed to the underside of the plow beam, a second turntable ring fixed to the top of the top rail and cooperating with the first ring, said rings having cooperating locking pin holes, a locking pin movable vertically through the plow beam and engageable with the ring openings, a collar on said pin above the beam and forming a stop to limit downward movement of the pin, an inverted U-shaped yoke carried by the plow beam and having a guide opening in its top for said pin, a spring surrounding the pin between the top of the yoke and the collar, and means to raise the pin against the tension of said spring.

In testimony whereof I affix my signature.

STANISLAW WIELGUS.